T. MASEL.
DOUGH MOLDING MACHINE.
APPLICATION FILED MAR. 8, 1911.
1,005,566.
Patented Oct. 10, 1911.
2 SHEETS—SHEET 1.
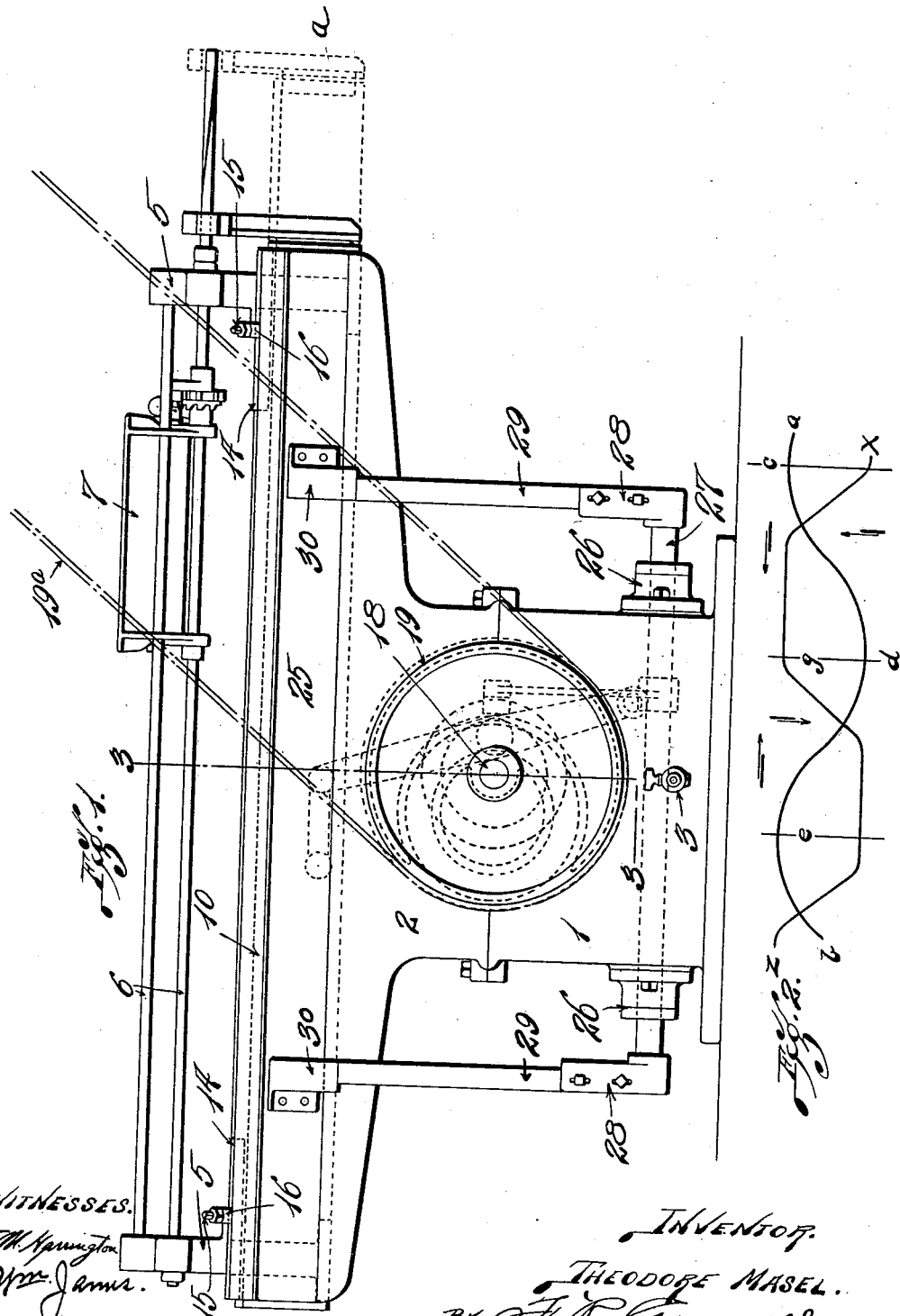

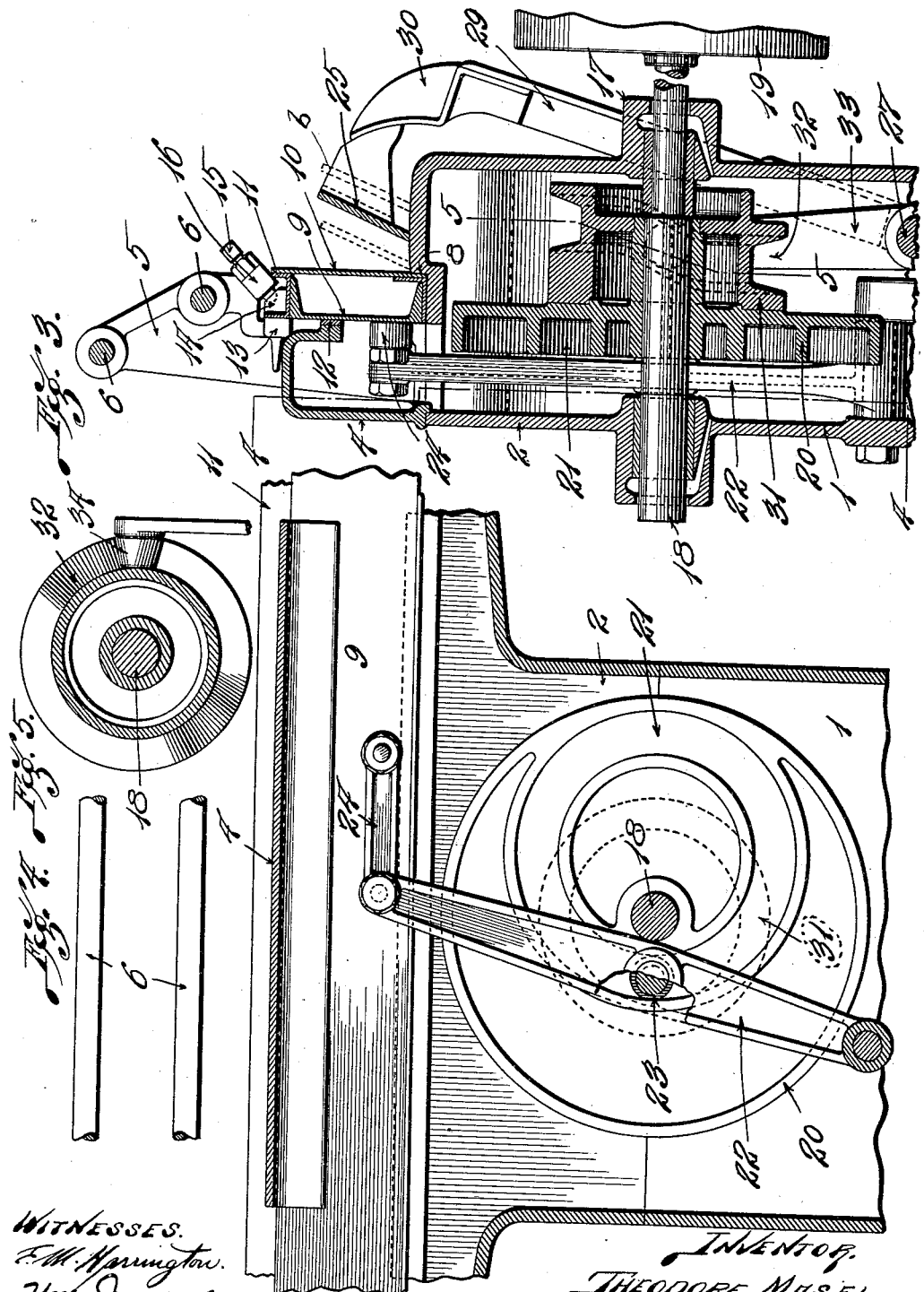

UNITED STATES PATENT OFFICE.

THEODORE MASEL, OF ST. LOUIS, MISSOURI, ASSIGNOR TO AMERICAN BAKERS MACHINERY COMPANY, OF ST. LOUIS, MISSOURI, A CORPORATION OF MISSOURI.

DOUGH-MOLDING MACHINE.

1,005,566.　　　　Specification of Letters Patent.　　Patented Oct. 10, 1911.

Application filed March 8, 1911. Serial No. 613,162.

*To all whom it may concern:*

Be it known that I, THEODORE MASEL, a citizen of the United States, residing at St. Louis, Missouri, have invented a certain new and useful Improvement in Dough-Molding Machines, of which the following is a full, clear, and exact description, such as will enable others skilled in the art to which it appertains to make and use the same, reference being had to the accompanying drawings, forming part of this specification, in which—

Figure 1 is a front elevation of a dough molding machine of my improved construction. Fig. 2 is a diagrammatic view illustrating, by the means of curved lines, the movements of the two molding boards. Fig. 3 is an enlarged vertical section taken approximately on the line 3—3 of Fig. 1. Fig. 4 is a vertical section taken on the line 4—4 of Fig. 3. Fig. 5 is a detail section taken on the line 5—5 of Fig. 3.

This invention relates to dough molding machines, and is particularly designed as an improvement on similar machines shown and described in Patents Numbers 947,500, 957,390 and 978,233.

In machines of the character to which my invention relates the lumps of dough of proper weight are delivered to the machine and are automatically and gradually fed therethrough from end to end during which time certain movable elements of the machine engage the lumps of dough with rolling pressure and knead said lumps of dough after the manner of manual manipulation. The rolling pressure applied to the lumps of dough stretches the skin on said lumps from the top and sides thereof downwardly to substantially a point at the bottom of the lump, and such kneading or molding operation tends to prevent the formation of large air or gas bubbles within the loaf and by subjecting the lumps to uniform treatment throughout simultaneously with the skin stretching operation the texture throughout the body of the loaf is of uniform quality.

To the above purposes my invention consists in novel features of construction and arrangement of parts hereinafter more fully described and claimed.

The main body portion of the machine as shown comprises a box-shaped base 1, which is preferably cast in a single piece and mounted on the upper portion of said base is an elongated hollow bed or body 2, preferably formed of cast metal in a single piece. The base 1 is made box-shaped and the joint between the parts 1 and 2 is made oil tight as it is the intention to maintain a supply of lubricating oil within the base 1 for the purpose of lubricating the moving parts contained therein. A cock 3 is located in the lower portion of the base 1 for the purpose of supplying oil to said base or permitting said oil to discharge therefrom.

Formed on or fixed to the top of the elongated body portion 2 and at the rear side thereof is an inverted L-shaped rail 4 and formed on or fixed to the ends thereof is a pair of upwardly projecting brackets 5, which serve as supports for the ends of a pair of longitudinally disposed rods 6. Mounted on these rods 6 adjacent the right hand end of the machine is a flour sifting device 7 particularly designed for distributing flour onto the lumps of dough as they are delivered to the machine between the molding parts thereof.

The longitudinally reciprocating molding board forming a part of the machine is positioned on top of the central portion of the longitudinally extending body 2 immediately in front of the rail 4. A vertically disposed shoulder 8 is formed in the top of the body 2 and extends the entire length thereof, and the lower front corner of the molding board bears directly against this shoulder. The molding board as shown comprises a channel 9, and a front dough engaging plate 10, said parts being rigidly connected in any suitable manner and located on top of the channel 9 is a small channel 11 disposed so that its legs project upwardly.

A wear plate 12 is fixed on the front side of the rail 4 and the rear side of the channel 9 bears directly against this wear plate during the reciprocation of the mold board. The rear side of the channel 11 bears directly against blocks 13 formed integral with the lower portions of the brackets 5, and arranged within the end portions of the channel 11 are bearing blocks 14 which are held in position by the points of set screws 15, which latter are seated in lugs 16 formed on the brackets 5. Thus the molding board comprising the channels 9 and 11 and front plate 10 is held to reciprocate upon the top of the body 2, and bearing against the shoulder 8 the wear plate 12 and the blocks 13 and 14. The blocks 14 can be tightened to take up any wear or lost motion by tightening the set screws 15.

Journaled in suitable bearings 17 formed between the parts 1 and 2 is a horizontally disposed shaft 18 on the forward end of which is fixed a pulley 18 adapted to receive a driving belt 19ª. Fixed on this shaft within the parts 1 and 2 is a disk 20 in the rear face of which is formed a circular groove 21, the same being eccentrically arranged with respect to the axis of the shaft 18.

Journaled within the part 1 below the disk 20 is the lower end of a lever 22 and mounted thereon and located within the groove 21 is a roller 23. The upper end of the lever 22 is pivotally connected to one end of a short link 24, the opposite end of which is pivotally connected to the rear side and central portion of the channel 9.

The mechanism just described provides means for converting the regular rotary motion of the shaft 18 into regular reciprocating motion, and imparting said reciprocating motion to the molding board, comprising the parts 9, 10 and 11. The laterally moving molding board comprises an inclined plate 25 which is positioned on top of the body 2, immediately in front of the reciprocating molding board, and said plate 25 extends the entire length of the body 2.

Journaled in suitable bearings 26 formed in the lower portion and ends of the body 1, is a shaft 27, and carried by the ends of said shaft are upwardly projecting blocks 28. Adjustably positioned on said blocks are the lower ends of upwardly extending arms 29, and carried by the upper ends thereof are inwardly curved brackets 30, which are fixed to the outer face of the laterally moving molding board 25.

Fixed on the shaft 18 immediately in front of the disk 20 is a drum 31, and formed in the periphery thereof is a cam groove 32. Fixed on the shaft 27 within the part 1 is an upwardly projecting arm 33, and carried by the upper end thereof is a roller 34 which occupies the groove 32. Approximately one-half of the groove 32 is formed adjacent one edge of the drum 31, and the remaining one-half is formed adjacent the opposite edge of said drum, and the meeting ends of the two parts of said groove are formed on an abrupt curve or angle so that the roller in traversing the groove moves quickly from one-half to the other thereby imparting corresponding quick movement to the arm 33, shaft 27, arms 29 and molding board 25. The top surface of the body 2 in front of the shoulder 8, over which the lower edge of the molding board 25 travels, is made entirely convex in cross section, and the line of curvature being concentric with the axis of the shaft 27.

In Fig. 2 the compound curved line $a—b$ graphically illustrates the regular movement of the reciprocating molding board comprising the members 9, 10 and 11, and the line $x—z$ graphically illustrates the movement of the laterally moving molding board 25. The forward movement of the reciprocating molding board corresponds to that portion of the line $a—b$ indicated by $c—d$, and the rearward movements of the part is represented by that portion of the line between the marks $d—e$. The forward movement of the inclined molding board 25 is designated by that portion of the line $x—z$ between $x$ and $y$ while the receding movement of said laterally moving molding board 25 is indicated by that portion of the line $x—z$ from $y$ to $z$.

A driving belt applied to the pulley 19 rotates the shaft 18 and consequently rotates the disk 20, and the disk 31. The lever 22 carrying the roller 23 which operates in the groove 21 is moved regularly backward and forward, and consequently the molding board comprising the parts 9, 10 and 11 is reciprocated lengthwise with a regular motion.

Simultaneous with the movement of the reciprocating molding board the laterally moving molding board 25 is vibrated or moved toward and away from the reciprocating board, and which movement is brought about by means of the roller 34 traveling in the cam groove 32, and which movement is transmitted to the arm 33, shaft 27 and arms 29. The parts having the grooves 21 and 32 are arranged so that when the reciprocating molding board starts on its forward movement the laterally moving molding board 25 is quickly moved forward toward said reciprocating molding board, or to the position as shown by dotted lines $a$, Fig. 3, and said molding board 25 maintains this forward position during the entire time the reciprocating molding board is moving forward.

At the beginning of the rearward movement of the reciprocating molding board the inclined molding board 25 is quickly withdrawn to the position shown by the dotted line $b$, Fig. 3, and which quick withdrawal is brought about by the movement of the roller 34 from one part of the groove 32 into the other, and thus the laterally moving molding board 25 is held withdrawn until the next forward movement of the reciprocating molding board.

The lumps of dough of proper size are fed into the machine between the two molding boards, and as the molding board 25 moves toward the plate 10 the lumps of dough are forced with pressure against said plate 10, and as said plate 10 moves lengthwise relative to the molding board 25, the lumps of dough are simultaneously squeezed and rotated.

The space between the molding boards is wedge-shaped at the time the molding board 25 is in its forward position, and the lumps of dough being simultaneously squeezed and rotated in this space are consequently rolled into approximately inverted conical lumps. As the combined pressure and rolling action takes place the skin on the surface of the upper portion of each lump will be drawn downward toward the lower end of the lump thus molding or kneading the dough after the manner of hand manipulation, and consequently accomplishing the desired result.

When the molding board 25 is drawn away from the reciprocating molding board on the rearward movement of the latter the lumps of dough are deposited onto the top surface of the body 2 between the molding boards, and on the next forward movement of the molding board 25 said lumps of dough are engaged and squeezed against the face of the reciprocating molding board. Thus the lumps of dough are intermittently engaged between the molding boards, and by reason of their engagement by the reciprocating board they are caused to intermittently move from one end of the machine to the other, and when they are taken from the left hand of the machine they are in condition to be placed into the pans or into the oven.

The flour sprinkling or sifting device is positioned above the right hand end of the machine, and is automatically actuated by the reciprocating molding board to sift and sprinkle flour over the lumps of dough as they are fed into the machine between the two molding boards.

A dough molding machine of my improved construction is comparatively simple, is composed of a minimum number of moving parts, and as the cams for moving both molding boards are mounted on a single shaft, said machine can be operated with comparatively little power.

It will be readily understood that minor changes in the size and form of the various parts of my improved molding machine may be made and substituted for those herein shown and described without departing from the spirit of my invention, the scope of which is set forth in the appended claims.

I claim:

1. In a dough molding machine, a support, a molding board arranged to reciprocate longitudinally thereon, a rigid support against which the rear end of the reciprocating molding board bears, and an adjustable support against which the top of the molding board bears during reciprocation.

2. In a machine of the class described, a support, a molding board arranged to reciprocate longitudinally thereon, a continuous rigid support against which the rear side of the molding board bears during operation, a wear plate on said last mentioned support, and adjustable supports against which the end portions of the molding board bear during reciprocation.

3. In a machine of the class described, a support, a molding board arranged to reciprocate longitudinally thereon, a shoulder on the support against which the lower portion of the reciprocating molding board bears during movement, a continuous rigid support against which the rear side of the reciprocating molding board bears, and adjustable supports against which the end portions of the top of the reciprocating molding board bear during operation.

4. In a machine of the class described, a support, a molding board arranged to reciprocate longitudinally thereon, a shoulder on the support against which the lower portion of the reciprocating molding board bears during movement, a continuous rigid support against which the rear side of the reciprocating molding board bears, a wear plate on said last mentioned support, and adjustable supports against which the end portions of the top of the reciprocating molding board bear during operation.

5. In a machine of the class described, a support, a molding board arranged to reciprocate longitudinally thereon, a shoulder on the support against which the lower portion of the reciprocating molding board bears during movement, a support against which the rear side of the reciprocating molding board bears, a rigid support against which the top of the reciprocating molding board bears during operation, and adjustable means for taking up wear and lost motion between said molding board and its bearings.

6. In a dough molding machine, a support, a molding board arranged to reciprocate longitudinally thereon, rigid bearings for the rear side and lower edge of said molding board, and adjustable bearings for the top of said molding board.

7. In a machine of the class described, a support, a molding board mounted for reciprocation thereon, continuous bearings for the lower portion and rear side of said molding board, bearings against which the end portions of the molding board engage, and adjustable means on said last mentioned bearings for engaging the end portions of the molding board, and holding the same against the bearings at the ends thereof.

8. In a machine of the class described, a hollow base an elongated support on said base, a molding board arranged for reciprocation on said support, a molding board arranged to move laterally with respect to the reciprocating molding board, a shaft journaled in the base, which shaft is transversely disposed with respect to the support, a member mounted on said shaft and provided with an eccentric groove, a lever pivotally mounted at one end and connected at its opposite end to the reciprocating molding board, a roller on said lever engaging in the eccentric groove, a rock shaft in the support, means on the first mentioned shaft for imparting movement to the rock shaft, and arms mounted on said rock shaft and connected to the laterally moving molding board.

9. In a machine of the class described, a hollow base adapted to contain a liquid lubricant, a support mounted on said base, a molding board arranged for reciprocation on said support, a shaft journaled in the base, which shaft is transversely disposed with respect to the support, a member on said shaft, which member is provided with an eccentric groove, a lever journaled in the base, and connected to the reciprocating molding board, a roller on said lever, which roller occupies a position within the eccentric groove, an inclined molding board arranged to move laterally in front of and with respect to the reciprocating molding board, and means whereby, laterally moving molding board is actuated simultaneously with the movement of the reciprocating molding board.

10. In a machine of the class described a hollow base adapted to contain a liquid lubricant a support on said base, a molding board mounted for reciprocating movement on said base, adjustable bearings for the top of said molding board, means whereby said molding board is reciprocated, a shaft journaled in the base, which shaft is transversely disposed with respect to the support, a drum thereon provided with a cam groove, a rock shaft journaled in the base, an arm carried thereby, a roller on the arm which roller is positioned in the cam groove in the drum, arms carried by the rock shaft, and a molding board carried by said arms and positioned in front of the reciprocating molding board.

In testimony whereof I hereunto affix my signature in the presence of two witnesses, this 4th day of March, 1911.

THEODORE MASEL.

Witnesses:
M. P. SMITH,
B. S. REID.

---

Copies of this patent may be obtained for five cents each, by addressing the "Commissioner of Patents, Washington, D. C."